United States Patent [19]

Mizuta

[11] Patent Number: 4,841,477

[45] Date of Patent: Jun. 20, 1989

[54] RESPONSE/PROCESSING APPARATUS FOR EXTERNAL-ABNORMAL-STATE IN DATA PROCESSING SYSTEM

[75] Inventor: Masaharu Mizuta, Hyogo, Japan

[73] Assignee: Mitsubishi Denki Kabushiki Kaisha, Tokyo, Japan

[21] Appl. No.: 240,470

[22] Filed: Sep. 6, 1988

Related U.S. Application Data

[63] Continuation of Ser. No. 917,524, Oct. 10, 1986, abandoned.

[30] Foreign Application Priority Data

Dec. 27, 1985 [JP]  Japan ................. 60-296042

[51] Int. Cl.⁴ ............................................. G06F 13/14
[52] U.S. Cl. ........................................................ 364/900
[58] Field of Search ... 364/200 MS File, 900 MS File

[56]  References Cited

U.S. PATENT DOCUMENTS

| | | | |
|---|---|---|---|
| 3,689,897 | 9/1972 | Sciuchetti | 364/200 |
| 4,027,290 | 5/1977 | Subrizi et al. | 364/200 |
| 4,062,059 | 12/1977 | Suzuki et al. | 364/900 |
| 4,100,605 | 7/1978 | Holman | 364/900 |
| 4,200,928 | 4/1980 | Allan et al. | 364/200 |
| 4,404,627 | 9/1983 | Marcantonio | 364/900 |
| 4,470,111 | 9/1984 | Jenkins et al. | 364/200 |

OTHER PUBLICATIONS

Iwao Morishita, "Guide to Microcomputer (2nd Ed.)", Mar. 16, 1985, pp. 173 and 195-197.

Primary Examiner—Eddie P. Chan
Assistant Examiner—Kevin A. Kriess
Attorney, Agent, or Firm—Bernard, Rothwell & Brown

[57]  ABSTRACT

The invention is in a data processing system comprising a data processing device and a data control device, and external abnormal signals inputted through the data processing device are stored by a latch circuit and then outputted as abnormal signals into a microcomputer. The logical sum of the external abnormal signals latched by the latch circuit is taken, and if the logical sum is significant an attention signal to inform generation of the abnormal state is outputted into a central control unit. An OR logic circuit for outputting a control signal to the central control unit is installed so as to take the abnormal signals from the latch circuit. By the external extraordinary signal introducing portion composed of the latch circuit and the OR logic circuit, the external abnormal signals can be processed without interrupting the task of the microcomputer.

4 Claims, 4 Drawing Sheets

RESPONSE/PROCESSING APPARATUS FOR EXTERNAL-ABNORMAL-STATE IN DATA PROCESSING SYSTEM

This is a continuation of application Ser. No. 917,524, filed Oct. 10, 1986, now abandoned.

BACKGROUND OF THE INVENTION

1. Field of the Invention

The present invention relates to data processing systems for processing data using computers or the like, and more particularly to a data processing system having a data processor which can process outer abnormal signals transmitted during generation of the abnormal state.

2. Description of the Prior Art

In general, a data processing system using computers or the like, as shown in a block constitution diagram of FIG. 1, broadly comprises a central control unit (hereinafter referred to as a "controller") 1 such as computer, and a data processing unit (hereinafter referred to as "data processor") 2 connected to the controller 1. Command signal 3 and response signal 4 are transmitted or received between the controller 1 and the data processor 2.

Operation of the data processing system in FIG. 1 will now be described. The controller 1 usually transmits the command signal 3 to the data processor 2 represented by computer peripheral equipment such as a fixed disk and receives the response signal 4 from the data processor 2 so as to control the transmission and receiving of data. Electronics products in recent years are likely to adopt a control system using intelligent command to an object to be controlled as above described.

When an abnormal signal is inputted from outside to the data processor 2 of the data processing system, in the prior art, the abnormal signal is processed by a constitution shown in FIG. 2 and FIG. 3. In FIG. 2, the data processor 2 is composed of a data processing device 5 and a data control device 6. During generation of the abnormal signal, an outer abnormal signal 7 generated accidentally at the data processing device 5 is transmitted from the data processing device 5 to the data control device 6. The data control device 6 controls the data processing function of the data processing device 5, and also has function of rapidly detecting the outer abnormal signal 7 and studying the cause, storing it in inner reduction and sorting, and preparing to transmit the response signal to the command signal 3 subsequently transmitted from the controller 1.

Operation based on the above constitution will be described. In the usual apparatus, in order to inform generation of the abnormal state to the controller 1 rapidly, the data control device 6 of the data processor 2 receives the outer abnormal signal 7 as an interrupt signal and interrupts the partial operation and performs the abovementioned abnormal state processing operation, and transmits an attention signal 8 which is a response signal separate from the response signal 4 into the controller 1. In response to the attention signal 8, the controller 1 transmits the command signal 3 in order to detect how the abnormal state is generated, and a response signal is generated from the data processor 2 in response to the command signal 3. Thereby the abnormal state is dealt with.

The data control device 6 for processing the outer abnormal signal 7 is constituted as shown in FIG. 3. The data control device 6 comprises a microcomputer 9 for receiving the command signal 3 and performing control for the data processing, and an external extraordinary signal introducing portion 10 such as an interrupt controller functioning as input means of the microcomputer 9 to plural accidental outer abnormal conditions. For example, I8085 of Intel is preferable as the microcomputer 9, and I8259 of Intel is preferable as the external extraordinary signal introducing portion 10.

Operation of the data control device 6 having the above detailed constitution will be described. The external extraordinary signal introducing portion 10 is constituted concretely by an integrated circuit (hereinafter referred to as "IC") for example, and is preferable to introduce generation of plural external abnormal conditions into the microcomputer 9 for processing. In other words, the external extraordinary signal introducing portion 10 supplies the start address for the program execution to the microcomputer 9 so that the microcomputer 9 stores generation of the external abnormal conditions and executes the processing from that of high priority. The start address of the program is different, of course, depending on the nature of the external abnormal condition. The microcomputer 9 executes the processing of the abnormal conditions based on signals from the external extraordinary signal introducing portion 10 and then outputs the attention signal 8 to the controller 1.

Normally, the task of the interrupt processing in the microcomputer 9 is executed so that the microcomputer 9 interrupts the task during execution. However, if there is no interrupt due to generation of external abnormal condition, of course, the task is executed continuously.

In the above-mentioned data processor in the prior art, as an example of hardware constitution for executing the data processing of the external abnormal signal 7 as interrupt signal when abnormal condition is generated, an external circuit is connected to the microcomputer 9 or the microcomputer 9 itself must have the interrupt processing function. The technical idea is disclosed in "Guide to Microcomputer (second edition)" p. 173, written by Iwao Morishita and published by Shokodo. Also in p. 195-197 of the book, a data processor with a priority interrupt controller is disclosed as another example of hardware constitution and an automatic priority interrupt mode is described as an example of operation of the data processor.

According to the data processing system having the above-mentioned constitution in the prior art, there are various problems as follows.

First, when the abnormal condition is generated outside of the data processor, the microcomputer 9 must have the interrupt processing function for interrupting the task during execution and processing the external abnormal signal. In order to prevent bad influence due to the interruption of the task in the microcomputer 9, a complicated external circuit must be added to the microcomputer 9 and the complicated task control must be performed by the external circuit.

The external extraordinary signal introducing portion 10 comprising an interrupt controller exclusive for the microcomputer 9 must be installed. The interrupt controller to constitute the external extraordinary signal introducing portion 10 is not a general purpose item, and moreover the IC employed as the interrupt controller is expensive in comparison to that in general use. Particularly, when the priority interrupt controller with LSI (large scale integrated circuit) assembled thereto is used, the manufacturing cost of the data processing system is significantly increased.

SUMMARY OF THE INVENTION

An object of the invention is to provide a data processing system, wherein when an external abnormal state occurs, an attention signal providing information concerning the generation of the abnormal state can be transmitted to a central control unit without interrupting the execution of the task in the microcomputer.

Another object of the invention is to provide a data processing system for general purpose at low manufacturing cost, wherein an external extraordinary signal introducing portion comprising a priority interrupt controller for example is installed within the apparatus, and an IC to be assembled to the external extraordinary signal introducing portion is constituted by a conventional IC.

In order to attain the above objects, in a data processing system according to the invention, an external extraordinary signal introducing portion installed together with a microcomputer in a data control device is composed of a latch integrated circuit (hereinafter referred to as "latch IC") and an OR logic circuit (hereinafter referred to as "OR circuit"), and when abnormal state occurs the external abnormal signal is latched by the latch IC and the logical sum of the latched external abnormal signal is processed in the OR circuit, and if the logical sum is significant the attention signal without relation to the microcomputer is transmitted immediately from the OR circuit to the central control unit.

DETAILED DESCRIPTION OF THE PREFERRED EMBODIMENTS

Preferred embodiments of a data processing system according to the invention will now be described in detail referring to the accompanying drawings.

Figure 1:
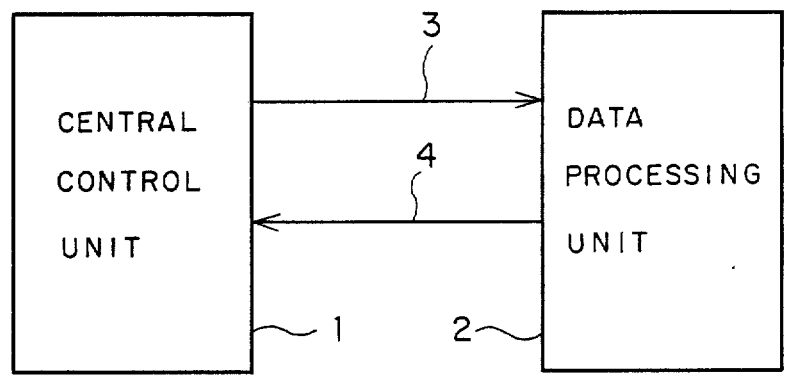
FIG. 1 is a block constitution diagram illustrating schematic constitution of a data processing system in general.
Figure 2:
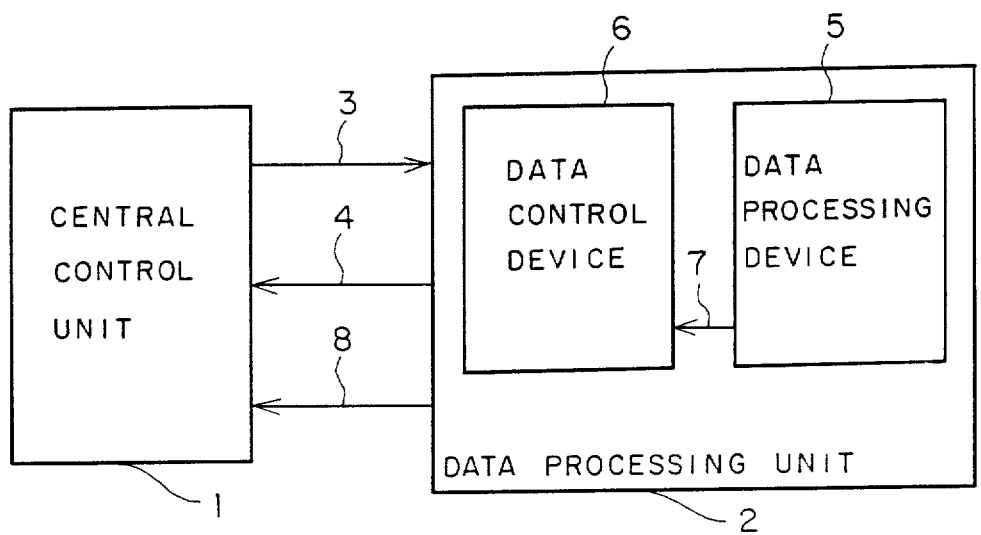
FIG. 2 is a block constitution diagram illustrating an example of a data processing system in the prior art.
Figure 3:
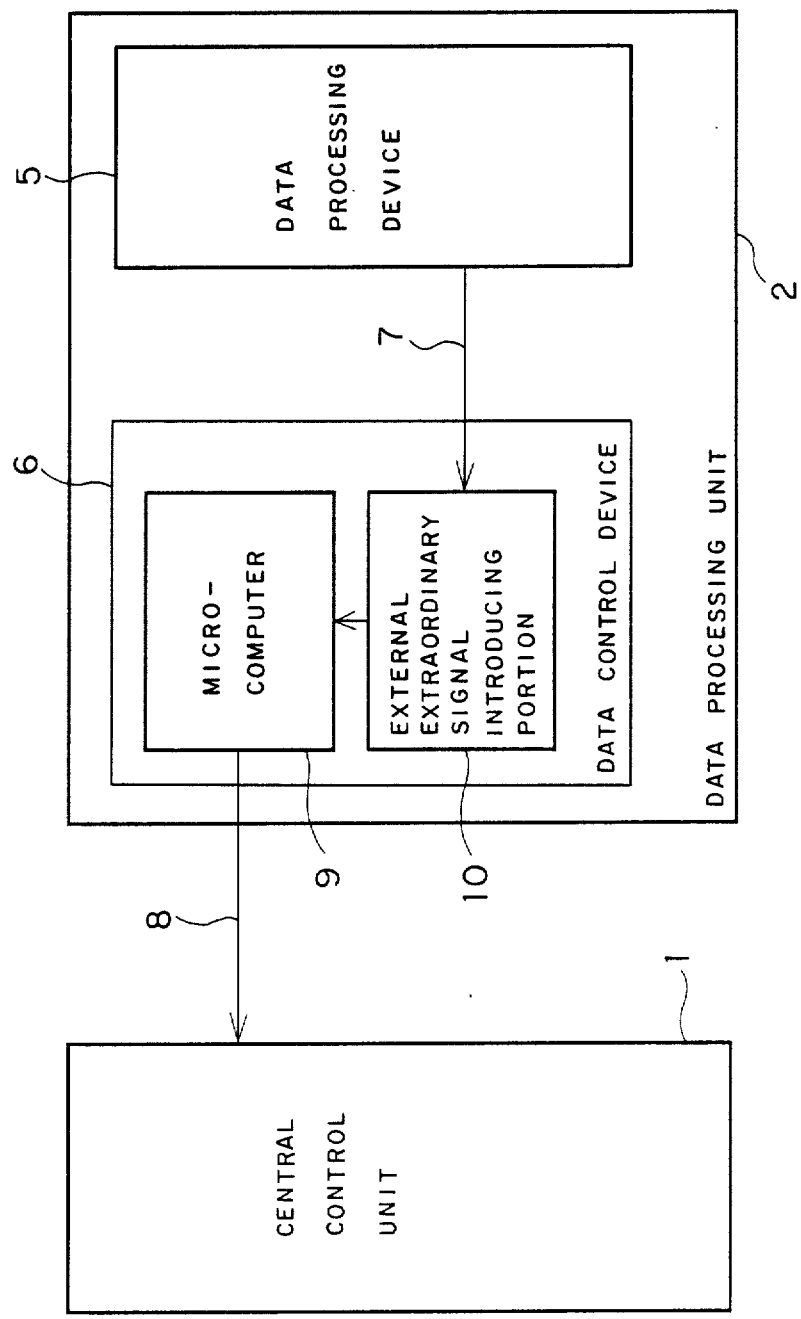
FIG. 3 is a block constitution diagram illustrating detail of a data control device of a data processing unit in the data processing system shown in FIG. 2.
Figure 4:
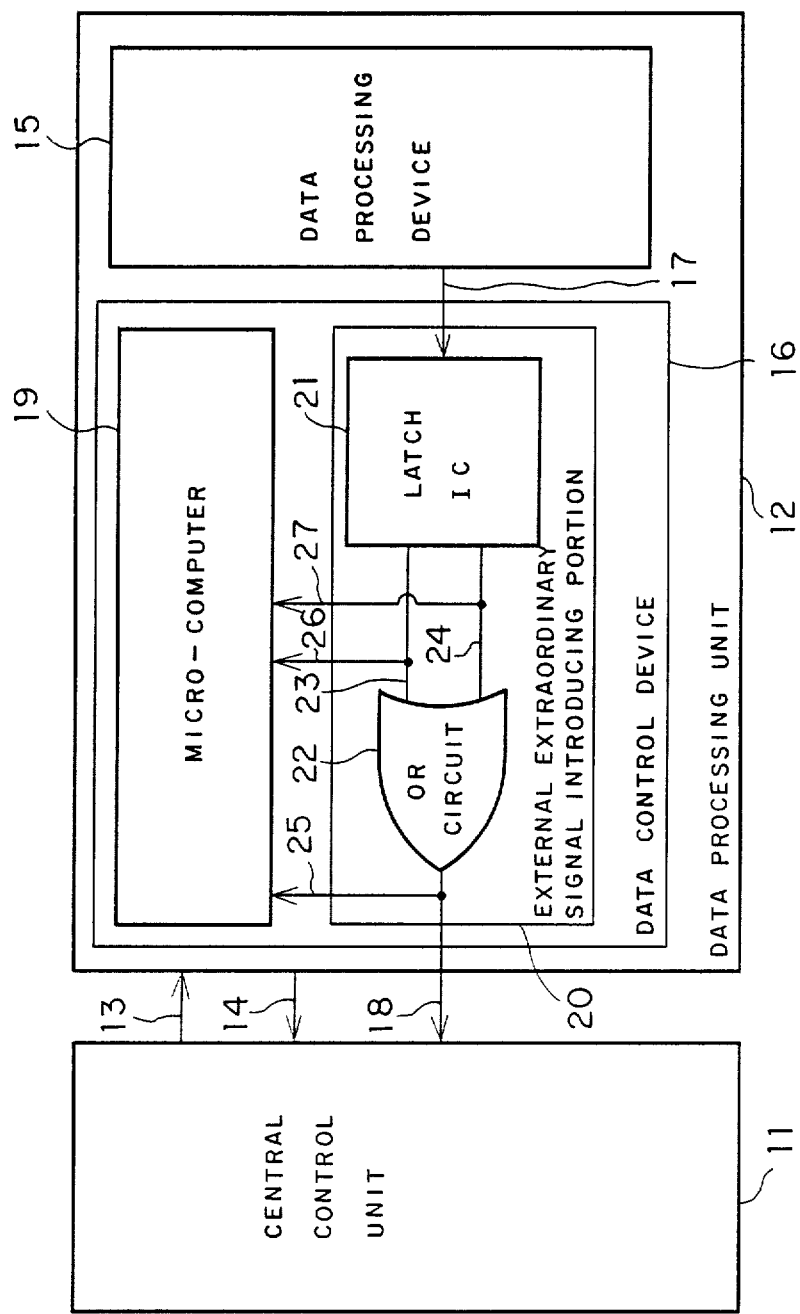
FIG. 4 is a block constitution diagram illustrating a data processing system as an embodiment of the invention.

FIG. 4 is a block constitution diagram illustrating a data processing system as an embodiment of the invention. In FIG. 4, the data processing system comprises a central control unit (hereinafter referred to as "controller") 11 such as computer, and a data processing unit (hereinafter referred to as a "data processor") 12. Command signal 13 and response signal 14 are transmitted or received between the controller 11 and the data processor 12. The data processor 12 is composed of a data processing device 15 and a data control device 16. External abnormal signal 17 is transmitted from the data processing device 15 to the data control device 16, and a controlled attention signal 18 is outputted from the data control device 16 to the controller 11. The data control device 16 is composed of a microcomputer 19 and an external extraordinary signal introducing portion 20. The constitution as hereinbefore described is similar to that of the prior art described using FIG. 3.

In FIG. 4, the external extraordinary signal introducing portion 20 is composed of a latch integrated circuit (hereinafter referred to as "latch IC") 21 for storing the abnormal signal 17 accidentally generated, and an OR logic circuit (hereinafter referred to as "OR circuit") 22 where the signal becomes significant if an abnormal state occurs in any of the abnormal signals 23, 24 latched by the latch IC 21. Output signal of the OR circuit 22 is outputted as the attention signal 18 to the controller 11 and also as output signal 25 to the microcomputer 19. The abnormal signals 23, 24 being output by the latch IC 21 are inputted as input signals 26, 27 through the input port (not shown) of the microcomputer 19.

Operation based on the above constitution will be described. The abnormal signals latched by the latch IC 21 are introduced into the microcomputer 19 and into the OR circuit 22. If the output signals of the OR circuit 22 are significant, one of the output signals is introduced into the microcomputer 19 and other becomes the attention signal 18 and is informed to the controller 11. Signals 25, 26, 27 to the microcomputer 19 are connected to the input port of the microcomputer 19, and read according to the program of the microcomputer 19 if necessary. (Such method introducing signals to the microcomputer is generally called a polling system.) As clearly seen from the figure, as soon as the plural (two in this case) external abnormal signals 17 are generated, they are stored in the latch IC 21 and pass through the OR circuit 22 without relation to the microcomputer 19 and become the attention signal 18 so as to perform the duty of the data processor 12 to inform the signal to the controller 11 rapidly. Next, the duty of the external abnormal state processing (analysis and command response) of the microcomputer 19 by the program control will be described. Signal 25 is provided for easy understanding of the description, and preparation from other signals 26, 27 in the microcomputer 19 will do.

Figure 5:
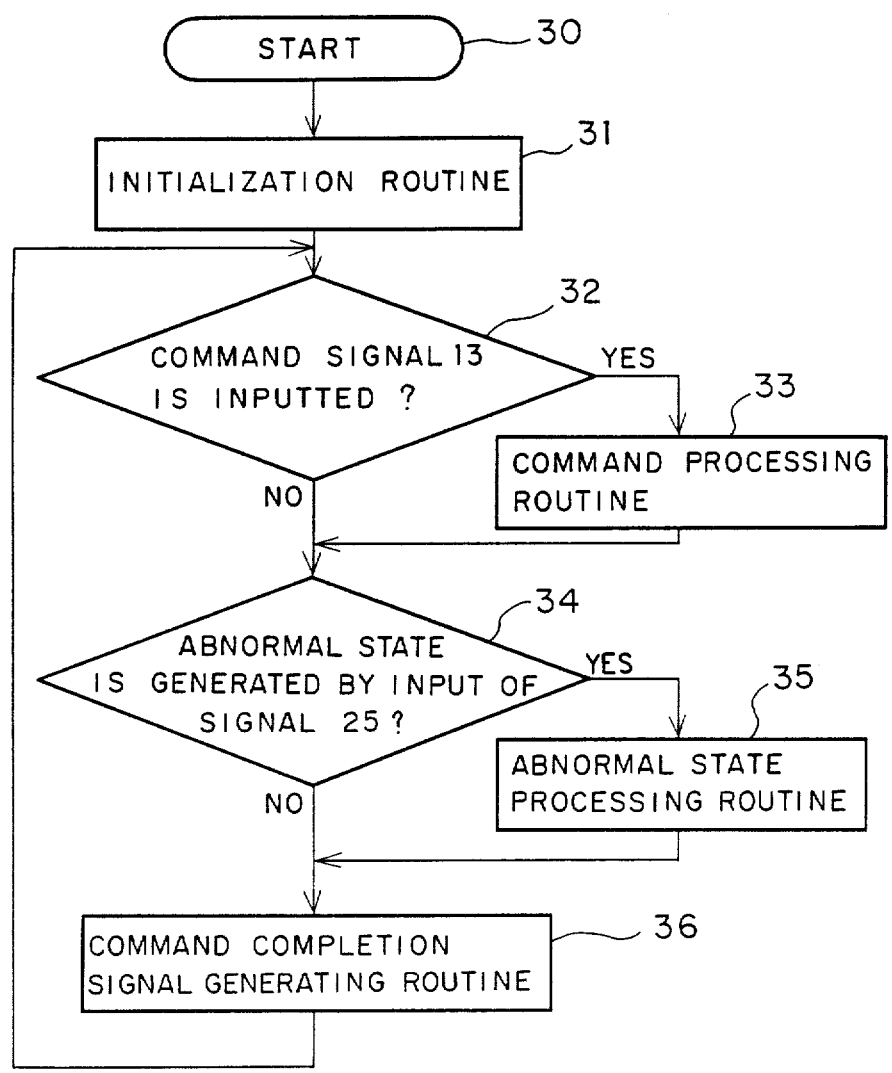
FIG. 5 is a flow chart illustrating operation of the data processing system shown in FIG. 4.

The microcomputer processing method in the abnormal state processing will now be described referring to a flow chart of the program control in FIG. 5. Step 30 represents start of the data processing system, step 31 a suitable initialization routine, and step 32 a command wait routine (routine for command signal 13 from the controller 11). Step 33 represents a command processing routine for executing a prescribed command function when the command signal 13 is applied, and step 34 an abnormal state discrimination routine for detecting generation of the abnormal state by the polling of the signal 25. Step 35 represents an abnormal state processing routine wherein if the signal 25 is significant, i.e., if an abnormal state occurs, the cause of the abnormal state latched externally is introduced by the abnormal signals 26, 27, and preparation of command response is performed before the application of the command signal 13 to grasp the abnormal state from the controller 11. Step 36 represents a routine wherein when no abnormal signal is generated the command completion signal is generated, but when the abnormal signal is generated the command completion signal is generated after finishing of the abnormal state processing. The data processor 12 always loops the main loop, and if the abnormal state occurs the data processor 12 always informs the updated abnormal signal to the controller 11 by the attention signal 18.

Two abnormal signals are generated in the description of the embodiment, but if the number of the abnormal signals increases the invention becomes more effective. In conventional method, the expensive and special interrupt controllers increase and the program control is complicated.

According to the invention as above described, since the external extraordinary signal introducing portion for inputting the accidental abnormal signals to the microcomputer is composed of the latch IC and the OR logic circuit, the invention has the following effects.

First, in the invention, when the external abnormal state occurs, since the attention signal is formed by the external extraordinary signal introducing portion without relation to the microcomputer, interruption of the task of the microcomputer can be prevented.

Since the task need not be interrupted as above described, a complicated external circuit as a means for avoiding the bad influence due to the task interruption need not be installed. Thereby the whole system can be simplified.

Further, since an interrupt controller to which IC for exclusive use without compatibility and an expensive LSI are assembled need not be installed in the microcomputer, the data processing system having the interrupt controller for general purpose can be obtained and also the manufacturing cost of the data processing system can be significantly decreased.

What is claimed is:

1. A data processing system comprising:
   a data processing device installed in a data processing unit for processing prescribed data; and
   a data control device installed in the data processing unit and having an external extraordinary signal introducing portion for introducing external abnormal signals outputted from the data processing device, and a microcomputer for performing transmission/receiving of a command signal and a response signal between the external extraordinary signal introducing portion and a central control unit based on the abnormal signals outputted from the external extraordinary signal introducing portion,
   wherein said external extraordinary signal introducing portion is provided with a latch circuit for storing the external abnormal signals outputted from the data processing device and transmitting the external abnormal signals to the microcomputer, and an OR logic circuit for taking logical sum of the external abnormal signals latched by the latch circuit, said OR logic circuit having an output terminal connected both to the microcomputer and to the central control unit for outputting a control signal to the microcomputer and also for outputting an attention signal to the central control unit to inform the central control unit of an abnormal condition without interruption of processing by the microcomputer.

2. A data processing system as set forth in claim 1, wherein said OR logic circuit takes the logical sum based on two logical statements outputted from the latch circuit.

3. A data processing system as set forth in claim 1, wherein said OR logic circuit takes the logical sum based on three or more logical statements outputted from the latch circuit.

4. A data processing system as set forth in claim wherein said latch circuit is constituted by an integrated circuit.

* * * * *

UNITED STATES PATENT AND TRADEMARK OFFICE
CERTIFICATE OF CORRECTION

PATENT NO. : 4,841,477

DATED : June 20, 1989

INVENTOR(S) : Masaharu Mizuta

It is certified that error appears in the above-identified patent and that said Letters Patent is hereby corrected as shown below:

Column 4, line 30, after "method" insert --of--.

Column 6, line 33, after "claim" insert --1,--.

Signed and Sealed this

Seventeenth Day of April, 1990

Attest:

HARRY F. MANBECK, JR.

Attesting Officer

Commissioner of Patents and Trademarks